United States Patent
Lautenschläger (10) Patent No.: US 11,813,555 B2
(45) Date of Patent: Nov. 14, 2023

(54) DISTILLATION APPARATUS AND METHOD FOR EXTRACTION OF VOLATILE COMPONENTS FROM BIOLOGICAL MATERIAL, ESPECIALLY FROM PLANTS

(71) Applicant: Mikrowellen Labor Technik AG, Heerbrugg (CH)

(72) Inventor: Jens Lautenschläger, Heerbrugg (CH)

(73) Assignees: MIKROWELLEN LABOR TECHNIK AG, Heerbrugg (CH); MILESTONE S.r.L., Sorisole (IT)

( * ) Notice: Subject to any disclaimer, the term of this patent is extended or adjusted under 35 U.S.C. 154(b) by 0 days.

(21) Appl. No.: 17/736,318

(22) Filed: May 4, 2022

(65) Prior Publication Data

US 2022/0362684 A1    Nov. 17, 2022

(30) Foreign Application Priority Data

May 14, 2021   (EP) ...................... 21173803

(51) Int. Cl.
*B01D 3/10*      (2006.01)
*B01D 3/38*      (2006.01)
*C10B 53/02*     (2006.01)
*B01D 3/40*      (2006.01)

(52) U.S. Cl.
CPC ................ *B01D 3/10* (2013.01); *B01D 3/38* (2013.01); *B01D 3/40* (2013.01); *C10B 53/02* (2013.01)

(58) Field of Classification Search
None
See application file for complete search history.

(56) References Cited

U.S. PATENT DOCUMENTS

| 10,568,864 B2 | 2/2020 | Sorbo et al. |
| 2004/0147767 A1 | 7/2004 | Whittle et al. |
| 2008/0302787 A1 | 12/2008 | Erskine et al. |
| 2011/0014331 A1 | 1/2011 | Stull, Jr. et al. |
| 2015/0068113 A1 | 3/2015 | Connor et al. |
| 2019/0217504 A1 * | 7/2019 | Wang ...................... B29B 17/02 |

FOREIGN PATENT DOCUMENTS

| DE | 4336268 A1 * | 4/1994 | ......... B01D 11/0273 |
| EP | 0294177 A2 | 12/1988 | |
| EP | 1629725 A1 | 3/2006 | |

(Continued)

OTHER PUBLICATIONS

PE2E translation of WO 2010/075952.*

(Continued)

*Primary Examiner* — Jonathan Luke Pilcher
(74) *Attorney, Agent, or Firm* — The H.T. Than Law Group (57) ABSTRACT

The invention refers to a distillation apparatus (100) for extraction of volatile components from biological material (50), especially from plants, comprising a housing (10) defining a sample chamber (S), a drum (30) arranged in the sample chamber (S), the drum (30) defining a receiving chamber (R) for receiving the biological material (50), and at least one microwave generator (70) for irradiating the biological material (50) with microwave radiation when received in the drum (30); wherein the drum (30) is rotatably arranged in the sample chamber (S) about a rotation axis (H) which is oriented substantially horizontally.

19 Claims, 2 Drawing Sheets

(56) References Cited

FOREIGN PATENT DOCUMENTS

| FR | 3003181 A1 | 9/2014 | | |
|---|---|---|---|---|
| WO | WO-2010075952 A1 | * | 7/2010 | ............ B29B 17/02 |
| WO | 2019106313 A1 | 6/2019 | | |

OTHER PUBLICATIONS

PE2E translation of DE 4336268 A1.*
Perino et al. "Laboratory to pilot scale: Microwave extraction for polyphenols lettuce." Food Chemistry 204 (2016). 108-114. Elsevier Ltd., 2016.
Filly et al. "Solvent-free microwave extraction of essential oil from aromatic herbs: From laboratory to pilot and industrial scale." Food Chemistry 150 (2014). 193-198. Elsevier Ltd.
Ramadan et al. "A New Hybrid Sysetm for Reuse of Agro-industrial Wastes of Acerola: Dehydration and Fluid Dunamic Analysis." Waste and Biomass Valorization (2019). 10:2273-2283. Springer Science + Business Media B.V., Feb. 23, 2018.
Machine translation for FR 3003181 to Innovation & Dev Company IDCO.
Machine translation for WO 2019106313 to Univ D'Avignon et des Pays de Vaucluse.
Machine translation of EP 1629725 to Visinoni et al.

* cited by examiner

DISTILLATION APPARATUS AND METHOD FOR EXTRACTION OF VOLATILE COMPONENTS FROM BIOLOGICAL MATERIAL, ESPECIALLY FROM PLANTS

FIELD OF THE INVENTION

The present invention relates to a distillation apparatus and method for extraction of volatile components such as oils from biological material, especially from plants by means of microwave radiation. Preferably, the biological material may be plant material from the biological family Cannabaceae.

BACKGROUND OF THE INVENTION

Extraction of volatile components is used to gain products or intermediate products, which may be used in the fields of pharmacy, medicine, cosmetics, food technology and the like. In case of Cannabaceae, it may be desirable to extract terpenes as volatile components, preferably as a pre-processing step.

Methods for extraction of volatile components by means of microwave radiation are known. Usually, the biological material is heated by microwave radiation, such that water in the biological material evaporates and breaks the cell structure, so that both, water vapor and volatile components are released and can be collected, e.g. by means of condensation.

An apparatus and method for extraction of volatile components from biological material such as plants by means of microwave radiation is known, for example, from EP 1 629 725 A1.

Therein, the biological material is loaded into a glass container, which is rotatable about a vertical axis by means of a rotary plate. The glass container is arranged in a microwave oven. The glass container is sealably connected to a cylindrical connecting duct, so that the interior of the container is isolated from the microwave oven. The cylindrical connecting duct leads to an upper outside of the microwave oven, where it is connected to a condenser. The biological material rests on a carrier plate, the carrier plate having three support stands resting on the bottom of the glass container. The glass container is partially filled with water, such that the biological material does not immerse in water. Radiating the biological material and water in the glass container with microwave radiation then leads to the breakage of cell walls and release of volatile components from the biological materials and simultaneously leads to water vapor formation, further promoting the release of volatile components. The volatile materials can be collected after condensing it in the condenser.

However, as the glass container is rotating relative to the cylindrical connecting duct, the sealing interposed therebetween has to be renewed for each cycle of extraction. This increases both, time needed for preparing the next cycle and material consumption.

SUMMARY OF THE INVENTION

The present invention has been made considering the above circumstances and aims at providing an apparatus and method with simplified handling and increased efficiency.

This object is solved by the present invention according to the independent claims. The dependent claims study further advantageous aspects of the present invention.

According to a first aspect of the present invention, there is provided a distillation apparatus (in the following also simply referred to as "apparatus") for extraction of volatile components from biological material, especially from plants (such as plant material from the biological family Cannabaceae). The apparatus comprises a housing defining a sample chamber. The apparatus further comprises a drum arranged in the sample chamber. The drum defines a receiving chamber for receiving the biological material. The apparatus further comprises at least one microwave generator for irradiating the biological material with microwave radiation when received in the drum. The drum is rotatably arranged in the sample chamber about a rotation axis which is oriented substantially horizontally.

"Volatile components" according to the present invention mean components of the biological material, which can vaporize at a given temperature and pressure, preferably at temperatures at or below the boiling point of water and at atmosphere pressure or under (partial) vacuum. For example, the volatile components may be essential oils. Preferably, the volatile components may be terpenes, for example to be extracted from plant material from the biological family Cannabaceae.

"Drum" according to the present invention means a hollow body that has a rotation axis about which it is rotatable. The rotation axis preferably being defined by a longitudinal direction of the hollow body. The drum may be symmetrical in shape, such as substantially cylindrical. However, the drum is not limited to a cylindrical shape and various shapes are suitable, depending on the circumstances. For example, the drum could also be in the shape of a truncated cone, ellipsoid, a polyhedron and the like. According to a preferred embodiment, the drum may comprise a receiving opening at at least one of its axial sides—or simply is open on at least one of its axial sides—for (easily) receiving the biological material in the receiving chamber.

"Microwave generator" according to the present invention means any device capable of producing microwave radiation.

According to the first aspect, the structure and efficiency of the apparatus can be simplified. By having a substantially horizontal rotation axis, the receiving chamber is easily accessible from a front side without removing the drum and irrespective of the rotational position of the drum; e.g. in contrast to the apparatus of EP 1 629 725 A1. Consequently, the drum can be rotatably fixed in the sample chamber and does not have to be removed. Handling the biological material is thus simplified. Further, according to the present invention, the drum does not need to be sealed from the surrounding sample chamber, so that there is no need for a sealing element that would need to be replaced regularly. Therefore, the apparatus according to the present invention is simplified in structure and allows a more efficient operation.

Preferably, the apparatus is suitable for dry distillation, which is understood to be the heating of solid materials to produce a gaseous phase of the volatile components, which may be condensed into liquids or solids. This increases efficiency of extraction.

The invention can, for example, be applied to a plant, which encompasses whole plants or just parts thereof, or even intermediate products based on plants, such as pre-processed plant material. For example, present invention is applicable to cannabis stems/leaves/flower buds, fruits such as citrus fruits or parts thereof, herbs, spices, etc. The biological material can be efficiently deodorized by the claimed apparatus and method. Most preferred, the biological material is plant material from the biological family Cannabaceae.

Preferably, the receiving chamber may be configured to receive at least one flexible receptacle into which the biological material is loaded. Preferably, the receptacle is a bag such as a cotton bag.

Therefore, it is possible to further simplify handling and increase efficiency, as the biological material does not need to be handled as such—i.e. loosely —, but may be loaded into a receptacle which is easier to transport and load into and unload from the apparatus. Further, this allows for preparation of a new batch of receptacles while an extraction cycle is still running, thus minimizing unproductive time. In case of using a bag as a receptacle, this allows for using commercially available products, minimizing costs. Bags, like cotton bags, may also allow for easily pre-wetting the biological material, as the cotton material sucks up the pre-wetting liquid, like water, and keeps it ready for the distillation process. Preferably, the bag can be permeable to the volatile components, e.g. due to its material and/or a structure in the material (e.g. mesh, holes, slits, etc.) as described in the following.

The receptacle or bag may be made from a flexible material, such as a textile, for example a woven or non-woven fabric. While it is preferred that the receptacle is a bag such as a cotton bag, other materials are also suitable, such as synthetic fibers and/or other natural fibers such as hemp, jute, flax and the like. The receptacle may also be made from structured material, such as perforated synthetic foil.

It is preferred that the receptacle is at least partially permeable for microwave radiation, liquids and/or gases, so that e.g. the volatile components can easily evaporate. This further enhances efficiency.

Preferably, a bottom space of the sample chamber may be configured to be filled with a liquid such as water. Further, the drum may be arranged such that part of the receiving chamber is arranged in the bottom space so as to immerse in the liquid when the bottom space is filled with said liquid. A level sensor may be provided to monitor the filling level of the bottom space.

This allows for easy and preferably continuous or periodical wetting of the biological material and enhances both, microwave absorption and evaporation, as the volatile components are more easily evaporated, thus further increasing efficiency of extraction. Further, versatility of the apparatus is increased as biological material in practically any hydration state may be used, for example also (freeze) dried biological material.

Preferably, the housing may comprise an opening (in the following also referred to as "housing opening") for accessing the drum, preferably the receiving chamber. The opening may be selectively closable by a door. Preferably, if the bottom space is present, the opening may be positioned above the bottom space. The receiving opening, if present, can preferably be arranged to be at least partially aligned with the housing opening.

This further simplifies the structure of the apparatus, as the drum may remain rotatably installed within the apparatus, and the opening in the housing can be used for accessing the drum and preferably the receiving chamber thereof. In case of the bottom space, by positioning the opening above the bottom space it is ensured that no liquid arranged in the bottom space may spill through the opening. The housing opening and receiving opening being (at least partially) aligned allows for an easy access to the receiving chamber. Handling of the apparatus is thus further simplified.

Preferably, the apparatus may further comprise a plurality of microwave generators, preferably three microwave generators. The main emission directions of the microwave generators may be substantially orthogonal and preferably not-intersecting. Each main emission direction may be either substantially perpendicular or substantially parallel to the rotation axis of the drum.

It is further preferred that the microwave generator(s) is/are (a) magnetron(s). Using magnetrons allows for a cost efficient structure of the apparatus, as these are easily commercially available. Using a plurality of microwave generators allows for the maximum power of irradiation to be increased and thus further increases efficiency of operation. By suitably arranging the preferred plurality of microwave generators, the interference of microwaves can be optimized to avoid heat spots and allow for even heating of the biological material, especially by avoiding large local interference maxima and by distributing the radiation evenly in the biological material, thus further enhancing extraction. By arranging the main emission directions as preferred, it is ensured that the microwave generators do not interfere with each other, thus avoiding damaging of the microwave generators.

Preferably, the apparatus may further comprise at least one heating element, such as a heating pad. The heating element may be arranged and configured to heat an inner wall of the housing defining the sample chamber.

By heating the inner wall, condensation of liquid and volatile components on the wall of the sample chamber can be avoided. Furthermore, heating power of the apparatus can be increased, so that batch time can be reduced. Therefore, efficiency of the apparatus can be thus further increased.

Preferably, at least one temperature sensor may be provided to monitor a process temperature at at least one desired location of the apparatus (and in case of a plurality of sensors, preferably at different locations) In case of the collection vessel be provided, the temperature sensor can be provided to monitor the temperature of the condensed volatile components as the process temperature. Further or alternative suitable locations may be in the sample chamber (e.g. at a top section thereof or close to or in the outlet) and/or in the receiving chamber and/or in the bottom space, the latter preferably for measuring/monitoring the temperature of the liquid filled in the bottom space.

By using at least one temperature sensor, the distillation process can be effectively monitored. For instance, a visual or acoustic warning may be output in case a defined temperature threshold value is underrun or exceeded. Furthermore, extraction quality can be increased, as for example in a case where the condensed volatile components collected in the collection vessel exceed a certain temperature, e.g. the temperature threshold value, the apparatus may be configured to stop irradiating the biological material and/or heating the at least one inner wall in order to stop power output, preferably until the temperature falls under the certain temperature again, upon which irradiation and/or heating the inner wall(s) may be continued. In general, preferably irradiation of the biological material and/or heating of the at least one inner wall can be stopped in case a define threshold value of the process temperature monitored by the temperature sensor is underrun or exceeded, and more preferably the irradiation and/or the heating is continued in case the process temperature again rises over or drops below the said threshold value.

Preferably, the apparatus may comprise a control unit to control the process of the apparatus. This is preferably done dependent on particular process parameters. These process parameters may be process temperatures, like temperatures in the sample chamber, of the liquid and/or of the biological material, e.g. based on the data received by the (temperature) sensors. Also, these process parameters may include the type and/or amount of biological material. The control unit may thus control the rotational speed of the drum, the microwave generator(s), the heating elements, the filling level of the bottom space, a cleaning cycle, and the like.

Preferably, the apparatus may further comprise at least one condenser configured to condense the volatile components. The condenser may be fluidly connected to the sample chamber via an outlet and may be arranged downstream of the sample chamber.

Therefore, the volatile components can be easily collected by condensation. A commercially available condenser may be used, simplifying the structure of the apparatus. By using a plurality of condensers, preferably in parallel, condensation capacity can be increased and the efficiency of the apparatus is further enhanced.

Preferably, the apparatus may further comprise a collection vessel configured for collecting the condensed volatile components. The collection vessel may be fluidly connected to and arranged downstream of the condenser(s). The collection vessel may preferably be configured for separating the condensed volatile components from residual liquid, such as condensed water. The collection vessel may preferably be fluidly connected to the sample chamber via an inlet to return the condensed residual liquid to the sample chamber. The inlet preferably is at a location different from the outlet.

The condensed volatile components can thus be easily collected and removed from the apparatus, further simplifying the handling. By the preferred separation of residual liquid, efficiency of the apparatus can be further enhanced as less liquid is wasted and by increasing purity of the condensed volatile components. If returning the residual liquid to the sample chamber at a location different from the outlet, cooling capacity of the condenser is not impeded by the liquid, increasing efficiency of the apparatus. The return of the residual liquid may be controlled either manually or even automatically, e.g. by use of the control unit.

Preferably, the drum may have a drum wall defining (e.g. circumferentially delimiting) the receiving chamber. Preferably, the drum wall may extend circumferentially about the rotation axis. The drum, preferably its drum wall if present, may be at least partially permeable to microwave radiation and/or liquid and/or the volatile components. The drum or drum wall may comprise at least one carrier protruding towards the receiving chamber to facilitate a tumbling motion of the biological material or receptacle, if present, when the drum is rotating.

The drum wall thus may act for securely retaining the biological material or receptacle in the receiving chamber, thus simplifying the handling. If the drum wall is permeable to microwave radiation and/or liquid and/or the volatile components, emission of microwave radiation can be enhanced and free flow of the liquid and/or volatile components is ensured. By providing carriers, the biological material is subject to higher mechanical energy generated by the tumbling motion, facilitating breakage of cell walls and extraction. Using carriers also provides even mixing of the biological material and thus more homogenous heating.

According to a second aspect, the present invention further provides a method for extracting volatile components from biological material, especially from plants. The method may optionally comprise providing an apparatus according to the present invention and as described herein above, so as to use the same for the said method. The method comprises loading the biological material into a receiving chamber of a drum being arranged in a sample chamber, in which the drum is arranged rotatably about a rotation axis being oriented substantially horizontally. The method further comprises irradiating the biological material with microwave radiation while the drum is rotating, and collecting the volatile components.

The definitions, preferable aspects and advantages given above for the apparatus apply similarly to the method. Accordingly, present invention also provides a method for extracting volatile components with simplified handling and increased efficiency.

Preferably, the method may also comprise filling a bottom space of the sample chamber with liquid, preferably water. Part of the receiving chamber (i.e. a bottom part thereof) may immerge in the liquid so that the biological material is wetted, preferably continuously or periodically wetted, with the liquid during rotation of the drum.

By wetting the biological material during extraction, preferably continuously or periodically, i.e. over a significant duration of the extraction, more liquid is available for extraction, thus further increasing efficiency of the method. By providing the liquid in a bottom space of the sample chamber, no separate means for water application are needed, thus simplifying the method. In a preferred embodiment, the filling level can be monitored or even controlled, e.g. dependent on particular process parameters like temperatures in the chamber, of the liquid and/or of the biological material, type and/or amount of biological material, and the like. By making (the part of) the receiving chamber immerge in liquid during rotation, it is possible to achieve a continuous or periodic wetting process, which allows for optimizing the amount of liquid available in the biological material for extraction. Efficiency of the method can thus be further enhanced. Furthermore, by wetting the biological material, scorching of the biological material can be prevented.

Preferably, the method may comprise pre-wetting the biological material with a liquid, preferably water, prior to loading it into the drum. The method may alternatively or in addition comprise pre-wetting the biological material in the filled bottom space, if present, preferably outside of irradiation of the biological material with microwave radiation.

By pre-wetting the biological material prior to extraction, more liquid is available for extraction, further increasing efficiency of the method. Further, by pre-wetting the biological material the versatility of the method is enhanced, as it is also possible to condition the biological material prior to extraction, if needed. This can be, e.g., beneficial for (freeze) dried material.

Preferably, the method may comprise heating at least one inner wall of a housing defining the sample chamber.

This allows for a reduction of condensation of liquid on the inner walls, as also described herein above.

Preferably, the collecting of the volatile components may comprise condensing the volatile components in a condenser, which is fluidly connected to and arranged downstream of the sample chamber. The condensed volatile components may be collected in a collection vessel being fluidly connected to and arranged downstream of the condenser. The collected volatile components may be separated from residual liquid, such as condensed water, wherein the residual liquid may preferably be returned to the sample chamber, if desired.

This allows for simplified collection of the volatile components by condensation with a condenser, as described herein above. Efficiency of the extraction can thus also be enhanced. By separation from residual liquid, purity of the volatile components can be increased, thus further enhancing efficiency of the method.

Preferably, the method may further comprise monitoring a process temperature of the method, e.g. at at least one desired location of the apparatus (and in case of using a plurality of sensors preferably at different locations) by means of at least one temperature sensor. In case of the collection vessel be provided, at least the temperature of the condensed volatile components may be monitored as the process temperature. The method, preferably at least the irradiation of the biological material and/or the heating of the at least one inner wall, is then controlled based on the monitored process temperature.

By monitoring the process temperature, the distillation process can be effectively monitored. For instance, a visual or acoustic warning may be output in case a defined threshold value of the monitored process temperature is underrun or exceeded. Furthermore, extraction quality can be increased, as for example in a case where the condensed volatile components collected in the collection vessel exceed a certain temperature, e.g. the threshold value, the method may include stopping irradiation of the biological material and/or heating the at least one inner wall in order to stop power output, preferably until the temperature falls under the certain temperature again, upon which irradiation and/or heating the inner wall(s) may be continued.

In general, preferably controlling the method based on the monitored process temperature may comprise stopping the irradiation of the biological material and/or stopping the heating of the at least one inner wall in case a define threshold value of the monitored process temperature is underrun or exceeded. Controlling the method based on the monitored process temperature may preferably additionally comprise continuing the irradiation of the biological material and/or continuing the heating of the at least one inner wall in case the process temperature again rises over or drops below the said threshold value.

Preferably, the biological material may be provided, preferably filled, in a flexible receptacle, preferably a bag such as a cotton bag, prior to being loaded into the receiving chamber. Further, the biological material may be in a fresh or pre-processed state, such as (freeze-)dried, frozen and/or cut. The biological material may be plant material from a biological family Cannabaceae, and the volatile components may be from the group of terpenes.

By loading the biological material in a receptacle such as a bag, handling of the biological material can be simplified and the loading time can be reduced, as described herein above. Further, this allows for using biological material in a substantially arbitrary state, such as freeze-dried, dried, fresh, pre-processed and/or cut. Versatility of the method can thus be increased.

These and further features and advantages will also become apparent from the figures. The examples shown in the figures and described hereinafter are non-limiting, and various modifications within the scope of the invention as defined by the appended claims are possible.

Unless indicated otherwise or not feasible, all aspects of the present invention according to the claims and description can be combined arbitrarily.

DETAIL DESCRIPTION OF THE INVENTION

Figure 1:
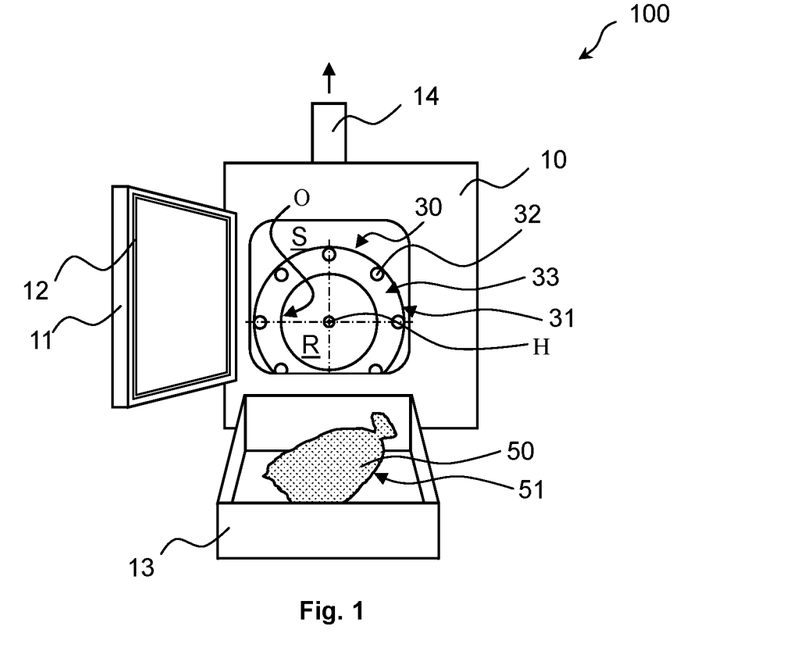
FIG. 1 shows a schematic front view of a distillation apparatus according to an embodiment of the present invention.
Figure 2:
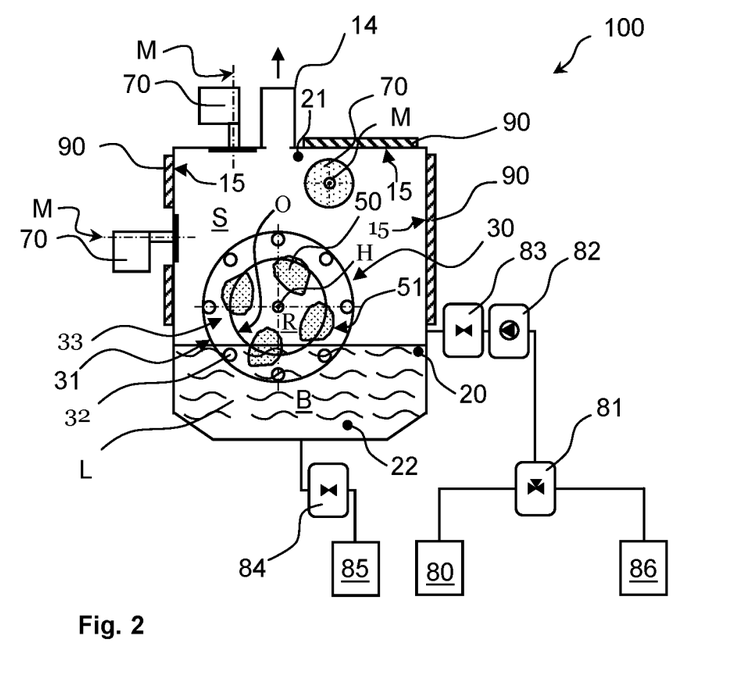
FIG. 2 shows a sectional front view of a distillation apparatus according to another embodiment of the present invention.

A distillation apparatus 100 according to the present invention is schematically shown in FIGS. 1 and 2. The distillation apparatus 100 is an apparatus 100 for extraction of volatile components such as terpenes from biological material 50 such as plants, for example from the biological family Cannabaceae. The apparatus 100 comprises a housing 10 which defines a sample chamber S. A drum 30 is arranged in the sample chamber S. The drum 30 defines a receiving chamber R for receiving the biological material 50. The drum 30 is rotatably arranged in the sample chamber S about a rotation axis H, which is oriented substantially horizontal. The drum 30 is, for example, driven by a motor that is preferably arranged outside of the sample chamber S. The apparatus 100 further comprises at least one microwave generator 70 for irradiating the biological material 50 with microwave radiation, when the biological material 50 is received in the drum 30.

The biological material 50 may be positioned in the receiving chamber R as loose material or in a flexible receptacle 51, as shown in FIGS. 1 and 2. The flexible receptacle 51 is easy to handle and may be prepared in advance and then transported to the distillation apparatus 100, e.g. in a tray 13. The receptacle 51 can be a bag made from cotton and may be reusable.

As particularly shown in FIG. 2, the sample chamber S preferably has a bottom space B that may be filed with a liquid L. The type of liquid L used depends on the specific extraction, i.e. on the process parameters and type of biological material. However, it is preferred that water is used as the liquid L. The bottom space B may be filed with the liquid L from a liquid reservoir 80 fluidly connected to the sample chamber S. The liquid reservoir 80 may, for example, be a water container. A pump 82 may be provided and configured to selectively transfer the liquid from reservoir 80 to the bottom space using suitable valves 81, 83. A separate reservoir 86 may be used for a different liquid to be used for influencing the extraction or for containing a cleaning liquid to be used for cleaning the apparatus 100 in-between some or all extraction cycles. To release the liquid L from the bottom space, a collection container 85 may be fluidly connected to the bottom space, selectively closable and openable by a valve 84.

In a preferred embodiment, a level sensor 20 can be provided to monitor the filling level of the bottom space B. Also, temperature sensors 21, 22 may be provided to monitor a process temperature at at least one or a plurality desired location(s) of the apparatus 100. The process temperature can be the temperature in the sample chamber S (e.g. by temperature sensor 21 as exemplarily shown in FIG. 2) and/or in the receiving chamber and/or in the bottom space (e.g. by temperature sensor 22 as exemplarily shown in FIG. 2), preferably of the liquid filled in the bottom space B.

The apparatus 100 may comprise a control unit (not shown) to control the process of the apparatus 100; preferably dependent on particular process parameters like process temperatures (e.g. temperatures in the chamber(s), of the liquid and/or of the biological material), e.g. based on the data received by the sensors 20 to 22, and/or the type and/or amount of biological material, and the like. Hence, the filling level of the bottom space B can be controlled during operation or a cleaning cycle be carried out automatically. Also, the microwave generators 70 can be controlled to be operated for a most efficient and effective distillation process.

The drum 30 is preferably arranged such that part of it—i.e. a bottom part thereof—immerses in the liquid L in the bottom space B, when it is filled with the liquid L. Therefore, in this case, when the drum 30 rotates, there is always a segment of the drum 30 entering the liquid L and another segment not in the liquid L. The dwell time of the segment in the liquid L depends on the rotational speed of the drum 30 and can be freely adjusted and also preferably controlled by the control unit.

As shown in FIG. 1, the housing 10 may comprise an opening O via which the drum 30 or its receiving chamber R can be accessed. It is preferred that the drum 30 is fixedly installed in the apparatus 10, so that the receiving chamber R remains in place for loading and unloading of the biological material 50. The opening O may be selectively closable by a door 11 of the housing 10. The door 11 is preferably attached by a hinge. Preferably, the opening O is positioned above the bottom space B, i.e. the lowermost part of the opening O is preferably higher than the uppermost portion of the bottom space B, so that the door 11 may be opened even if the bottom space B is maximum filled with the liquid L. The door 11 may further include a sealing 12 for sealing the sample chamber S against the environment of the apparatus 10 when being closed. Further means for promoting a tight close of the door 11 may be provided, such as springs, cabinet bolts, lever closures etc. The door 11 may also be optically transparent but non-transparent for microwave radiation to provide better monitoring of the extraction process. A door sensor (not shown) may be provided to monitor the closed state of the door 11. The control unit may be configured to prohibit or stop a process, particularly an operation of the microwave generators 70, if the door sensor monitors the door 11 not being in a closed or locked state.

The apparatus 100 may also comprise more than one microwave generator 70, i.e. a plurality of microwave generators 70, as best shown in FIG. 2. The microwave generators 70 may, for example, be magnetrons. The microwave generators 70 have a main emission direction M, in which the microwave radiation is emitted into the sample chamber S. When a plurality of microwave generators 70 are used, it is preferred that the main emission directions M are substantially orthogonal and preferably not-intersecting with each other. This can be achieved by placing the microwave generators 70 at different sides of the housing 10. The main emission direction M may, for example, correspond to the longitudinal direction of a microwave generator's waveguide. If using three microwave generators 70, these sides preferably corresponding to three axes of Cartesian coordinates. Note that the leftmost and uppermost microwave generators 70 as shown in FIG. 2 are preferably placed in different depths relative to the picture plane, so that their axes M are not intersecting. Furthermore, as shown in FIG. 2, each main emission direction M is preferably also either substantially perpendicular or substantially parallel to the rotation axis H of the drum 30.

The apparatus 100 may further comprise at least one heating element 90, as shown schematically in FIG. 2. For example, such a heating element 90 may be a heating pad 90. The heating element 90 preferably is arranged and configured to heat an inner wall 15 of the housing 10 defining the sample chamber S. Here, the heating element 90 preferably is provided on/at the housing 10 to be in direct thermal contact with the inner wall 15. By heating the inner wall 15, condensation on the inner wall 15 can be avoided and heating can be made more efficient. The heating element 90 can also be controlled by the control unit.

While not explicitly shown in the figures, the apparatus 100 may further comprise one or more condensers configured to condense the volatile components. The condenser is preferably fluidly connected to the sample chamber S via an outlet 14 and arranged downstream of the sample chamber S. The condenser is preferably water-cooled. The fluid stream exiting the outlet 14 may be split into a plurality of streams, each fluidly connected to one of a plurality of condensers—preferably arranged in parallel—for increasing cooling capacity. To facilitate the volumetric flow rate of the fluid exiting the outlet 14, the condenser may further include a pump which may also be controlled by the control unit.

The volatile components condensed to a liquid (or solid) by the condenser are preferably collected in a collection vessel (not shown), such as a glass flask. It is also preferred that the collection vessel is configured for separating the condensed volatile components from residual liquid, such as condensed water. This separation may be done by using an elongated collection vessel, in which the condensed volatile components separate from residual liquid due to their different density and/or miscibility. For example, a commercial (glassware) separation system may be used. Preferably, the collection vessel or separation system can preferably be fluidly connected to the sample chamber S via an inlet (not shown) to return the condensed residual liquid, such as the condensed water, to the sample chamber S. Preferably, the return of liquid can be controlled by the control unit, e.g. by controlling a valve in a return piping. Preferably, the inlet is at a location different from the outlet 14, in order not to impede to cooling capacity of the condenser.

A vacuum pump (not shown) may be fluidly connected to the apparatus, e.g. the sample chamber and/or the condenser and/or the collection vessel, if present, so that the distillation process can be carried out under vacuum. The vacuum pump may be controlled by the control unit as well.

A temperature sensor (not shown) may be provided to monitor the temperature of the condensed volatile components, e.g. in the collection vessel, as the process temperature. Based on said process temperature, the control unit may control the process of the apparatus 100, e.g. by controlling the at least one microwave generator 70 and thus the irradiation of the biological material 50 and/or by controlling the at least one heating element 90 and thus the heating of the at least one inner wall 15. This will be described in more detail with respect to the method for extracting volatile components from biological material 50 herein below.

The drum 30 preferably has a drum wall 31 which defines the receiving chamber R. The drum wall 31 preferably extends circumferentially about the rotation axis H of the drum 30. The drum wall 31 may be one-piece or multi-piece. For example, the drum wall 31 may be made from a plurality of rods 32, extending in the axial direction of the drum 30 and fastened to circular end members 33 of the drum 30, as exemplarily shown in FIGS. 1 and 2. In another embodiment the drum wall 31 may be made of a mesh material or the like. The drum 30 and preferably its drum wall 31 is at least partially permeable to microwave radiation and/or liquid and/or the volatile components. This can, for example, be achieved by using rods or mesh material as described above. Preferably, the drum 30 is made from a non-metallic material in order not to interact with the microwave radiation. The drum 30 may be made from microwave transparent material, e.g. PTFE, ceramics, glass or the like.

The drum 30 and in particular the drum wall 31 may comprises one or more carriers protruding towards the receiving chamber R to facilitate a tumbling motion of the biological material 50 or receptacle 51, when the drum 30 is rotating. Such a carrier may, for example, be a protrusion formed on the drum wall 31 extending, for example, in a radial direction towards the rotational axis of the drum 30. Preferably, the rods 32 may act as the carriers, if present. The carrier thus acts as a carrier for biological material 50 or receptacle 51 contacting the protrusion, until contact is lost when the drum 30 has rotated far enough for the contact to be become instable. The biological material 50 or receptacle 51 then falls down from a particular height. This repeated motion of being carried for only part of the rotation and thus being lifted up, losing contact with the carrier and falling down thus forms a tumbling motion.

In the following, a method for extracting the volatile components from the biological material 50 according to the present invention and preferably by use of the apparatus 100 as described herein above is described.

Figure 3:
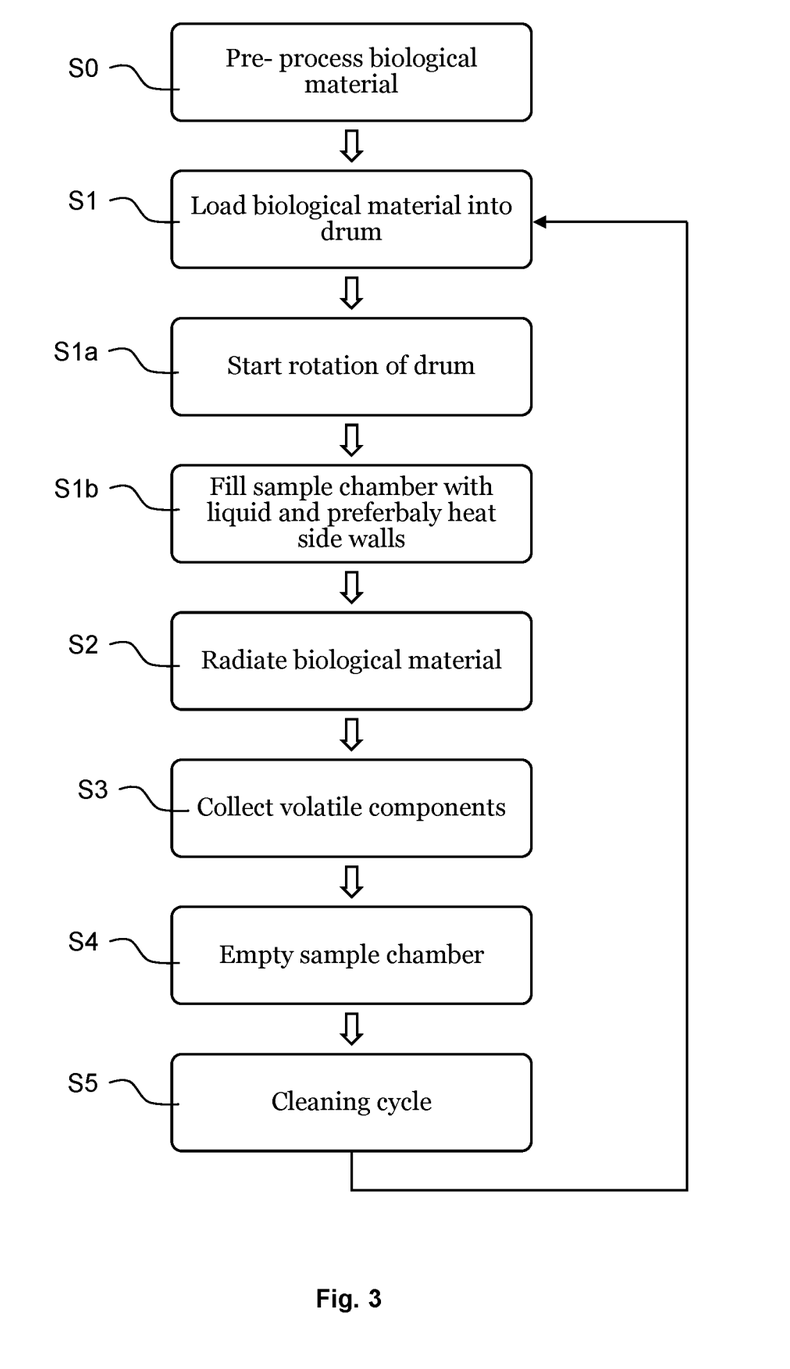
FIG. 3 shows a flow chart of a distillation method according to an embodiment of the present invention.

An example for a method according to the present invention including further optional steps is shown in FIG. 3. The method comprises step S1, which includes loading the biological material 50 (preferably be received or filled in the receptacle 51) into the receiving chamber R of the drum 30 being arranged in the sample chamber S, in which the drum 30 is arranged rotatably about the rotation axis H being oriented substantially horizontally. Preferably after loading of the drum 30 is completed, rotation of the drum 30 is started in step S1*a*. In step S2, the biological material 50 is irradiated with microwave radiation while the drum 30 is rotating. In step S3, the volatile components are collected; for example by condensation and subsequent collection preferably in the collection vessel.

For example, the method according to the present invention allows heating water within the biological material, so that the cells of the biological material are distended and, for example, their glands and oleiferous receptacles are ruptured to free volatile components.

As described above, the bottom space B of the sample chamber S may be filled with the liquid L. This is preferably done in step S1*b* prior to step S2, i.e. prior to the irradiation. It is also possible to (e.g. continuously or successively or periodically or otherwise in a preferably controlled manner) keep filling the bottom space B of the sample chamber S during extraction, e.g. to maintain a constant liquid volume in the bottom space B. By filling the bottom space B with liquid L, it is possible to wet the biological material 50 to a desired degree for extraction and preferably maintain this state during extraction, thus increasing the amount of liquid available for evaporation and promoting breakage of cell walls, while further increasing microwave absorption of the biological material 50.

If desired, the biological material 50 may be pre-wetted with a liquid, preferably water, prior to loading it into the drum 30 in step S0. In addition or alternatively, the biological material 50 may also be pre-wetted in the filled bottom space B, preferably outside of irradiation of the biological material 50 with microwave radiation. Other pre-processing steps for the biological material 50 are also possible, such as cutting. If the biological material 50 is loaded into the receptacle 51, this may be done at step S0.

It is possible to heat the inner wall 15 of the housing 10 in order to reduce condensation thereon, as described above. The inner walls 15 are preferably heated continuously throughout the whole extraction process, and preferably to a temperature higher than the boiling point at least of the volatile components, preferably also of the liquid L for a given pressure in the sample chamber S. Heating of the inner walls 15 is preferably started in step S1*b*, but may also be a separate step.

As described, the volatile components may be condensed for collecting them, preferably by using a condenser and collecting the volatile components in the collection vessel described above. This may also be part of Step S3. As already described, the collected volatile components are preferably separated from residual liquid, such as condensed water, and the residual liquid is preferably returned to the sample chamber S.

The method may further comprise monitoring a process temperature of the method, and controlling the method, preferably the irradiation S2 of the biological material 50 and/or the heating S1*b* of the at least one inner wall 15, based on the monitored process temperature. In this regard, controlling the method based on the monitored process temperature may preferably comprise stopping the irradiation S2 of the biological material 50 and/or stopping the heating S1*b* of the at least one inner wall 15 in case a define threshold value of the monitored process temperature is underrun or exceeded. More preferred, controlling the method based on the monitored process temperature may additionally comprise continuing the irradiation S2 of the biological material 50 and/or continuing the heating S1*b* of the at least one inner wall 15 in case the process temperature again rises over or drops below the said threshold value. In case of the collection vessel be provided, preferably at least the temperature of the condensed volatile components is monitored as the process temperature.

When extraction is finished, the sample chamber S may be emptied in step S4, for example by opening the door 11 and manually or automatically removing the biological material 50 or receptacle 51 from the drum 30. Prior to loading the receiving chamber R of the drum 3*o* with a new batch of biological material 50 or new receptacle 51, it is preferred that a cleaning cycle is performed in optional step S5. This can be done, for example, by using ethanol or other cleaning liquid provided in container 86 and transferred into the sample chamber S, for example through a nozzle or the like, via pump 82. The cleaning cycle S5 may or may not include heating the sample chamber S to a defined temperature. The cleaning liquid can be removed to the collection container 85 via valve 84 and the extraction method can be started again. It is preferred that a cleaning cycle is only done when different types of biological material are to be used, for example when changing from one plant type to another. If the same biological material is used for two consecutive batches, no cleaning cycle is necessary.

The present invention allows to extract volatile components from substantially any biological material 50. The state of the biological material 50 may be in principle arbitrary and especially a fresh or pre-processed state, such as (freeze-)dried, frozen and/or cut. The present invention can be advantageously applied to plants or parts thereof, such as herbs, spices, fruits such as citrus fruits, flower buds etc. It is preferred that the biological material 50 is plant material from the biological family Cannabaceae, and the volatile component preferably is from the group of terpenes.

The invention claimed is:

1. A distillation apparatus (100) for extraction of volatile components from biological material (50), comprising:
a housing (10) defining a sample chamber (S),
a drum (30) arranged in the sample chamber (S), the drum (30) defining a receiving chamber (R) for receiving the biological material (50), and
at least one microwave generator (70) for irradiating the biological material (50) with microwave radiation when received in the drum (30);
wherein the drum (30) is rotatably arranged in the sample chamber (S) about a rotation axis (H) which is oriented substantially horizontally,
wherein a bottom space (B) of the sample chamber (S) is configured to be filled with a liquid (L), and
wherein the drum (30) is arranged such that part of the receiving chamber (R) is arranged in the bottom space (B) so as to immerse in the liquid (L) when the bottom space (B) is filled with said liquid (L).

2. The distillation apparatus (100) according to claim 1, wherein the receiving chamber (R) is configured to receive at least one flexible receptacle (51) into which the biological material (50) is loaded.

3. The distillation apparatus (100) according to claim 1, wherein the housing (10) comprises an opening (O) for accessing the drum (30), the opening (O) being selectively closable by a door (11).

4. The distillation apparatus (100) according to claim 1, further comprising:
a plurality of microwave generators (70),
wherein the microwave generators (70) have main emission directions (M) that are substantially orthogonal to one another and not-intersecting.

5. The distillation apparatus (100) according to claim 1, further comprising:
at least one heating element (90),
wherein the heating element (90) is arranged and configured to heat an inner wall (15) of the housing (10) defining the sample chamber (S).

6. The distillation apparatus (100) according to claim 1, further comprising:
at least one condenser configured to condense the volatile components,
wherein the condenser is fluidly connected to the sample chamber (S) via an outlet (14) and arranged downstream of the sample chamber (S).

7. The distillation apparatus (100) according to claim 6, further comprising:
a collection vessel configured for collecting the condensed volatile components, the collection vessel being fluidly connected to and arranged downstream of the condenser.

8. The distillation apparatus (100) according to claim 1, further comprising:
at least one temperature sensor (21, 22) provided to monitor a process temperature at at least one desired location of the apparatus (100) and/or
a control unit to control the apparatus (100), based on process parameters including the process temperature.

9. The distillation apparatus (100) according to claim 1, wherein the drum (30) has a drum wall (31) defining the receiving chamber (R), the drum wall (31) extending circumferentially about the rotation axis (H), and/or
wherein the drum (30), is at least partially permeable to microwave radiation and/or liquid and/or the volatile components, and/or
wherein the drum (30) comprises at least one carrier, the carrier being a protrusion formed on the drum wall (31) extending in a radial direction towards the rotation axis (H) of the drum (30) to facilitate a tumbling motion of the biological material (50) when the drum (30) is rotating.

10. The distillation apparatus (100) according to claim 3, wherein the opening (O) is positioned above the bottom space (B).

11. The distillation apparatus (100) according to claim 4, wherein each of the main emission directions (M) is either substantially perpendicular or substantially parallel to the rotation axis (H) of the drum (30).

12. The distillation apparatus (100) according to claim 7, wherein the collection vessel is configured for separating the condensed volatile components from residual liquid.

13. The distillation apparatus (100) according to claim 12, wherein the collection vessel is fluidly connected to the sample chamber (S) via an inlet to return the condensed residual liquid to the sample chamber (S), and
wherein the inlet is at a location different from the outlet (14).

14. The distillation apparatus (100) according to claim 7, further comprising:
at least one temperature sensor (21, 22) provided to monitor a process temperature at at least one desired location of the apparatus (100),
wherein the temperature sensor is provided to monitor the temperature of the condensed volatile components as the process temperature.

15. A method for extracting volatile components from biological material (50) utilizing the distillation apparatus (100) of claim 1, comprising:
loading (S1) the biological material (50) into the receiving chamber (R) of the drum (30) being arranged in the sample chamber (S), in which the drum (30) is arranged rotatably about the rotation axis (H) being oriented substantially horizontally,
irradiating (S2) the biological material (50) with microwave radiation while the drum (30) is rotating, and
collecting (S3) the volatile components.

16. The method according to claim 15, further comprising:
filling (S1b) the bottom space (B) of the sample chamber (S) with liquid (L),
wherein part of the receiving chamber (R) immerges in the liquid (L) so that the biological material (50) is continuously or periodically wetted with the liquid (L) during rotation of the drum (30),
and/or
pre-wetting (S0) the biological material (50) with a liquid prior to loading it into the drum (30) and/or in the filled bottom space (B).

17. The method according to claim 15, further comprising:
heating (S1b) at least one inner wall (15) of the housing (10) defining the sample chamber (S).

18. The method according to claim 15,
wherein the step of collecting (S3) of the volatile components comprises condensing the volatile components in a condenser, which is fluidly connected to and arranged downstream of the sample chamber (S), and/or
wherein the method further comprises monitoring a process temperature of the method, and controlling the method based on the monitored process temperature.

19. The method according to claim 15,
wherein the biological material (50) is provided, in a flexible receptacle (51), prior to being loaded into the receiving chamber (R), and/or
wherein the biological material (50) is in a fresh or pre-processed state, prior to being loaded into the receiving chamber (R), and/or
wherein the biological material (50) is plant material from the biological family Cannabaceae, and wherein the volatile component is a terpene.

\* \* \* \* \*